(12) United States Patent
Merk et al.

(10) Patent No.: US 6,927,369 B2
(45) Date of Patent: Aug. 9, 2005

(54) HEATING DEVICE HAVING A FLEXIBLE HEATING BODY

(75) Inventors: Ernst Merk, Weissenhorn (DE); Ralf Köhler, Langenau (DE)

(73) Assignee: Beurer GmbH & Co., Ulm (DE)

( * ) Notice: Subject to any disclaimer, the term of this patent is extended or adjusted under 35 U.S.C. 154(b) by 0 days.

(21) Appl. No.: 10/474,579

(22) PCT Filed: Feb. 15, 2003

(86) PCT No.: PCT/EP03/01532

§ 371 (c)(1),
(2), (4) Date: May 24, 2004

(87) PCT Pub. No.: WO03/077397

PCT Pub. Date: Sep. 18, 2003

(65) Prior Publication Data

US 2004/0211769 A1 Oct. 28, 2004

(30) Foreign Application Priority Data

Mar. 14, 2002 (DE) .......................... 102 11 142

(51) Int. Cl.⁷ ................................ H05B 1/02
(52) U.S. Cl. .................... 219/505; 219/494
(58) Field of Search ................ 219/481, 485, 219/494, 497, 504, 505; 307/117

(56) References Cited

U.S. PATENT DOCUMENTS 4,205,223 A  5/1980  Cole 5,369,247 A  * 11/1994  Doljack .................. 219/485

FOREIGN PATENT DOCUMENTS

| DE | 44 80 580 C2 | 2/1997 |
| EP | 0 562 850 A2 | 9/1993 |
| WO | WO 99/30535 | 6/1999 |

* cited by examiner

*Primary Examiner*—Tu Hoang
(74) *Attorney, Agent, or Firm*—Pauley Petersen & Erickson (57) ABSTRACT

A heating system having an electrical heating conductor arrangement which is integrated into a flexible heating body that can be connected to a supply voltage by a connecting cable and has a first conductor and an adjacent second conductor, placed in series with the first and separated from it by an insulating device, having a heating circuit formed by the heating conductor arrangement and further elements, including a control element for a heating current. A control circuit is connected to the control member for affecting the heating current and regulating the temperature. Monitoring is extended because the insulating device has a resistance characteristic which decreases with temperature. The control circuit is coupled via a monitoring branch to a section of the heating circuit which, as a function of the temperature of the insulating device, responds to a resistance temperature change in the insulating device for picking up an electrical monitoring current or voltage, and the control circuit responds when the monitoring signal exceeds a threshold and interrupts the heating current by triggering the control element.

26 Claims, 3 Drawing Sheets

HEATING DEVICE HAVING A FLEXIBLE HEATING BODY

BACKGROUND OF THE INVENTION

1. Field of the Invention

This invention relates to a heating system having an electrical heating conductor arrangement, which is integrated into a flexible heating body, which can be connected to a supply voltage by a connecting cable and which has a first conductor and an adjacent second conductor, placed in series with the first and separated from it by an insulating device, having a heating circuit formed by the heating conductor arrangement and further elements, including a control element for a heating current, and having a control circuit connected to the control element for affecting the heating current and regulating the temperature.

2. Discussion of Related Art

Such a heating system has been generally disclosed in European Patent Reference EP 0 562 850 A2, wherein the particular purpose is a circuit for protecting the electrical heating conductor integrated into the flexible heating body against rising temperatures. The control circuit thus has a temperature regulating circuit, by which a heating current is varied via a control element in the form of a thyristor, for example by a phase control, for maintaining a desired temperature. Other embodiments of the control element, for example a mechanical, thermal or other electronic switch, are also mentioned. A control by pulse packets is also possible.

SUMMARY OF THE INVENTION

One object of this invention is to provide a heating system of the type mentioned above but wherein temperature monitoring is increased.

The object is attained with the characteristics taught in this specification and in the claims. The insulating device has a resistance characteristic which decreases with temperature, and the control circuit is coupled via a monitoring branch to a section of the heating circuit which, as a function of the temperature of the insulating device, responds to a resistance temperature change in the insulating device for picking up an electrical monitoring current or voltage. The control circuit responds when the monitoring signal exceeds a threshold and interrupts the heating current by triggering the control element.

With these steps, the insulating device between the interior conductor and the exterior conductor becomes increasingly conductive with an increase in temperature, particularly if local temperature peaks or hot spots result in the interior of the heating conductor arrangement of the flexible heating body. A locally responding sensor function is thus achieved wherein the heating conductor arrangement can be monitored within a centimeter range in a heated mattress pad or an electric blanket, and which can be used in lieu of a surface-integrated sensor system, such as used by the temperature control arrangement, which is formed by the heating conductors, for example with a positive temperature progression of the resistor, PTC effect.

In one embodiment a control branch having the control element, and a parallel branch located parallel therewith, are formed in the heating circuit, and the monitoring signal in the parallel branch is picked up at a parallel branch resistor, for example.

The dependability of the temperature monitoring system is further increased by the step wherein a temperature-dependent potentiometer is formed by the insulating device and a resistor arrangement, which reacts via a parallel branch diode arrangement only in connection with a half-wave of a supply voltage, at which the monitoring signal is picked up and supplied to the control circuit via the transfer branch of an evaluation unit. A dependable response is assured with this embodiment, even under extreme mechanical stress, such as with a sharp kinking or the like, a dependable response, for example to a short circuit, is assured.

In one embodiment a heating conductor diode is arranged between the first conductor embodied as an interior conductor and the second conductor embodied as an exterior conductor and is connected in series with them. The section of the heating circuit is embodied as a parallel branch, which is located parallel with the control branch having the control element and has a parallel branch diode arrangement, which is connected in series with a resistor arrangement and has at least one parallel branch diode arranged in the direction opposite to the conducting direction of the heating conductor diode. The control branch has at least one structural element connected in the conducting direction of the heating conductor diode.

In order to thus increase safety, two parallel branch diodes are connected in parallel, and the resistor arrangement includes two parallel branch resistors, which are connected parallel with each other and are connected with the ground.

There is a complementary safety step with a temperature safety device that is in a thermal operative contact with the resistor arrangement.

In one embodiment which is advantageous for the evaluation, the monitoring signal in the monitoring branch is connected with an input of a digital circuit arrangement containing the evaluation unit.

In an advantageous manner, for the pick-up of the monitoring signal the monitoring signal is connected to the input by a further potentiometer with monitoring branch resistors arranged in the monitoring branch.

The structure in connection with the temperature monitoring system is further developed by picking-up an electrical measurement value, current or voltage, which is a function of the temperature of the insulating device, the control circuit is coupled via a coupling branch with the heating circuit, and the control circuit is designed so that the control of the control element is designed for adjusting a set temperature of the heating body.

In this case steps are taken in the construction and the evaluation so that the measured value is picked up by a potentiometer formed in the heating circuit, which is formed by the heating conductor arrangement constituting a temperature dependent resistor and by at least one resistor element. The measured value is fed via the coupling branch to an analog time function element connected upstream of a digital stage with a resistance/capacitance circuit. The digitizing stage has a time measuring element for forming an actual digital value, and the actual digital value corresponds to an actual time value up to the time a preset or presettable charge voltage of the capacitor is reached. A reference time variable is preset or can be preset as the reference variable in the digital stage. For heating, the control of the control member occurs as a function of the deviation of the actual time value from the reference time variable.

Dependable functioning is enhanced if the control circuit has a safety circuit with an error sensor arrangement, and if an additional control element, which can be controlled via the safety circuit, is arranged in the heating circuit in series with respect to the control element, wherein the safety circuit responds to an error in the control circuit and interrupts the heating current by triggering the additional control element.

In other embodiments, a safety fuse is arranged in the heating circuit on the heating body or outside of the heating body. The heating conductor arrangement has only two heating conductor ends, which are extended from the heating body and at the connecting points are directly connected via a twin-pole plug/coupling unit or a hot lead connection with a twin-wire connecting line. The connecting points are located within an intermediate cord switching housing, as well as an optical and/or visual display unit, which responds to the monitoring signal.

BRIEF DESCRIPTION OF THE DRAWINGS

This invention is explained in greater detail in view of exemplary embodiments shown in the drawings, wherein.

DESCRIPTION OF PREFERRED EMBODIMENTS

Figure 1:
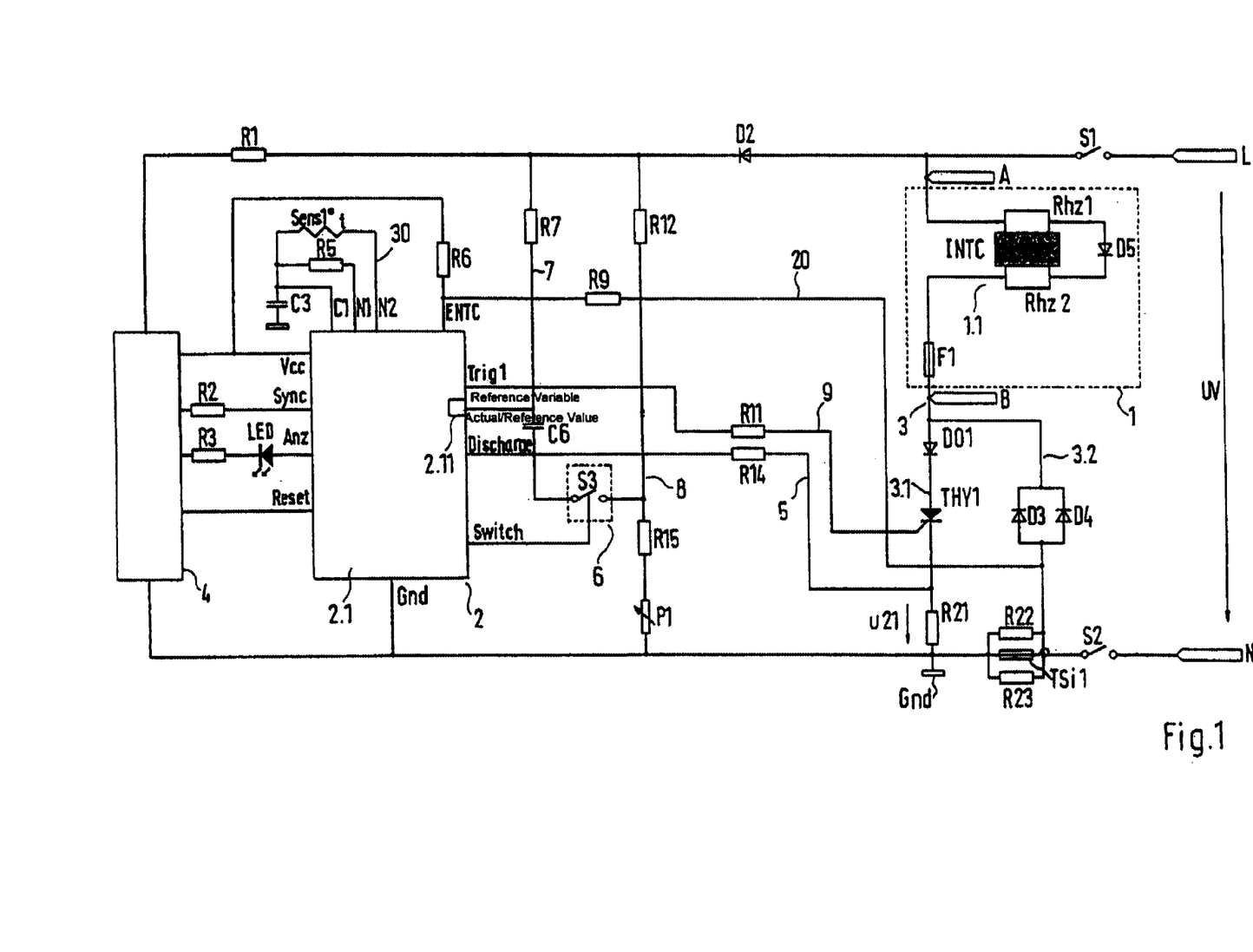
FIG. 1 is a schematic diagram of one embodiment of an electrical circuit of a heating arrangement.

In FIG. 1, a heating arrangement is shown, for example in the form of an electric blanket, a heated cushion, or a heated mattress pad, into which the heating conductor arrangement is integrated and in which a safety fuse F1 is housed. A flexible heating body 1, having a control circuit 2 acting on a heating circuit 3, has a heating current iH flowing through the heating circuit 3 with the heating conductor arrangement 1.1 which can be varied for adjusting a desired temperature. For reducing the electromagnetic field it is possible to connect the heating conductors with an interior conductor arranged in one direction with respect to the current, and an exterior conductor arranged in the opposite direction, as known in the art.

The heating circuit 3, which is connected to a supply voltage UV, for example a line voltage or other transformed voltage or d.c. voltage, and which can be disconnected therefrom by switches S1, S2 has, in a control branch 3.1 following the heating conductor arrangement 1.1 and the safety fuse F1, a diode D01, which is connected for a positive half wave in the conducting direction, or alternatively a thyristor or other rectifier, a control element THY1 in the form of a thyristor or triac or other semiconductor switch or electronically actuable mechanical contact, and a potentiometer resistor R2 with a connector located away from the control element THY1 connected to ground and which, together with the heating conductor arrangement 11, constitutes a potentiometer. The heating conductors Rhz1, Rhz2 of the heating conductor arrangement 1.1. are preferably insulated from each other by an insulating device (INTC), which melts at a suitable temperature and has a negative coefficient of temperature resistance (NTC effect), and are connected with each other, as known in the art, as the interior conductor and the exterior conductor of a heating cord, by which a compensation of the electromagnetic field is also achieved. The heating conductor arrangement is releasably connected, for example at two connecting points A, B in the edge area of the flexible heating body 1, or at a short piece of cable, with a plug/coupling unit in the heating circuit 3, or is connected with it via fixed connecting cables. The safety fuse F1 can also be arranged in the heating circuit 3 outside the flexible heating body 1, for example in the plug/coupling unit or in an intermediate cord switching element. The heating conductors Rhz1, Rhz2 have a temperature-dependent resistor, for example with a positive coefficient of temperature (PTC effect) or a negative coefficient of temperature (NTC effect), so that the potentiometer together with the potentiometer resistor R21 is independent of the temperature. Several heating circuits 3 can be provided in parallel or in series, wherein several heating cords are correspondingly arranged in the heating body 1.

For picking up the component voltage formed by the potentiometer from the potentiometer resistor R2 and the heating conductor arrangement 1.1, the control circuit 2 is connected via a coupling branch 5, as well as a control branch 9, to a control input of the control element THY 1, and has a digital control arrangement 2.1 which, for example, is embodied as a micro-computer, a microcontroller, a special integrated circuit arrangement (ASIC), CMOS gate or the like, and also has a time-measuring element, which is inserted in a charging branch 7 and a reference variable branch 6 and includes a resistor/capacitor circuit R7, C6 and of a further potentiometer 8 connected to the supply voltage UV, and has fixed resistors R12, R15 and an adjustable resistor P1, wherein a further diode D2 has been inserted in the conducting direction into the positive voltage connection. The further diode D2 is arranged so that the entire control circuit 2 is connected through it to the supply voltage UV.

A component voltage, which can be selected in accordance with a desired temperature of the heating body 1, is picked up at the further potentiometer 8 between the two fixed resistors R12, R15 for forming the reference variable branch 6 and can be set with the adjustable resistor in the form of a potentiometer P1. In this case the potentiometer P1 is located between the fixed resistor R15 on the ground side and the ground Gnd. The component voltage picked up at the further potentiometer 8 is applied to the capacitor C6 via a controllable switch S3 which, for opening and closing, is connected to the digital circuit arrangement 2.1 via a connector switch. Thus, for charging, the capacitor C6 is connected with one of its connectors via the charging resistor R7 to the positive pole of the supply voltage UV and, for forming the reference variable branch 6, is connected with its other connector via the controllable switch S3 and the fixed resistor R15 and the potentiometer P1 to ground wherein, for forming a reference value, the reference variable branch 6 can be at times closed in accordance with a control circuit algorithm fixed in the digital control arrangement 2.1. For detecting a charging voltage, the connector of the capacitor C6 connected with the charging resistor R7 can also be connected with an input connector of the digital circuit arrangement 2.1 for detecting the charging voltage, while the other connector of the capacitor C6 is preferably connected to a discharge connector (Discharge) of the digital circuit arrangement 2.1 in order to perform a controlled complete discharge of the capacitor C6. This other connector of the capacitor C6 is also connected via the coupling branch 5 with a resistor R14 for picking up the component voltage at the resistor R21 of the heating circuit 3, such as an actual measured value as a function of the temperature of the heating conductor arrangement 1.1, and thus of the heating body 1, wherein the connecting point is located in the heating circuit 3 between the control element THY1 and the potentiometer resistor R21. The control branch 9 contains a resistor R11 and is connected to a control connector Trig 1 of the digital circuit arrangement 2.1 for performing a temperature regulation of the heating body 1 as a function of a reference variable/actual value comparison, wherein suitable control algorithms can be preset, or programmed, by the digital circuit arrangement 2.1.

Alternatively, the discharge connector Discharge can also be omitted. Instead of generating component voltages via the resistors R7 and R12, it is also possible to apply corresponding d.c. voltages generated by the load circuit (heater), so that the resistors R7 and R12 can be saved. It is also possible to preset various reference variables in the digital circuit arrangement and to pick them up via associated connectors, which can be suitably actuated by changeover switches. With this the resistors R12, R15, P1, and the switch S3 can be replaced. In that case the reference variable is not preset via the adjusted resistor P1, but by the change-over switch. For example, a temperature-stabilized time cycle or a reference time in the digital circuit arrangement 2.1 can be provided for this purpose.

The other side the digital circuit arrangement 2.1 is connected via a connector Vcc with the energy supply 4 and via a ground connector Gnd to ground potential. In addition, further connections between the digital circuit arrangement 2.1 and the energy supply 4 exist via a synchronization connector Sync, a display connector Anz and a reset connector Reset, wherein a resistor R2 is connected to the synchronization connector Sync, and a display, for example in the form of an LED display LED, as well as a resistor arrangement R3, are connected to the display connector Anz. The energy supply 4 is connected to ground on one side, and on the other side is connected to the supply voltage UV via a resistor R1 and the further diode D2.

A parallel branch 3.2 with a diode arrangement of two parallel extending branch diodes D3, D4, which are connected to ground Gnd via a resistor arrangement R22, R23, is connected in parallel with the control branch 3.1 in the heating circuit 3 between the safety fuse F1 and the diode D01. A temperature safety device TSi1, which is in thermal operative contact with the two resistors R22, R23, is connected to the ground connector and is connected via the switch S2 to a pole of the supply voltage V, so that the temperature safety device TSi1, which reacts in the event of excess heating of the resistors R22, R23 during a temperature rise in the heating body 1, interrupts the supply current.

A heating conductor diode D5, which is connected in series with the interior conductor Rhz1 and the exterior conductor RHz2, is located between these in the heating conductor arrangement 1.1., only permits the passage of one half wave of the supply voltage UV, in the present case the positive half wave, and its anode correspondingly faces the positive pole and its cathode the negative pole of the supply voltage V, and is polarized in the same way as the control branch diode D01 located in the control branch 3.1. In contrast, the parallel branch diodes D3, D4 are arranged opposite the conducting direction of the heating conductor diode D5, so that they do not permit the heating current, which flows in the normal state, to pass, but only permit a negative half wave to pass, which occurs when the heating conductor diode D5 is bridged. The negative half wave has a variable size, depending on whether this is related to a short circuit between the interior conductor Rhz1 and the exterior conductor RHz2, or a more or less large heating of the insulating device INTC at a defined location, and also depends on whether the location of the rising temperature or the short circuit is more or less distant from the connecting points A and B of the heating conductor arrangement 1.1.

The voltage drop resulting in a negative half wave because of the resistors R22 and R23 is picked up between the diode arrangement D3, D4 and the resistor arrangement R22, R23 by a monitoring branch 20 and is supplied for evaluation via a monitoring branch potentiometer with resistors R9, R6 to the digital circuit arrangement 2.1 via an input connector ENTC, wherein the pick-up occurs between the two resistors R9, R6, and the other connection of the resistor R6 is connected to a reference voltage, for example the supply voltage Vcc of the digital circuit arrangement 2.1.

The control circuit 2 also has a housing temperature monitoring device 30, which is connected via further connectors C1, N1, N2 to the digital circuit arrangement 2.1, wherein the three connecting branches lie parallel with each other and are connected via a common connecting point to a further capacitor C3, whose other connector is connected to ground. In this case the connector C1 is located directly at the connecting point, while the connector N1 is connected to the connecting point via the resistor R5, and the connector N2 is connected to the connecting point via a housing temperature sensor Sens1, which is based on the PTC effect or the NTC effect, for example.

Figure 2:
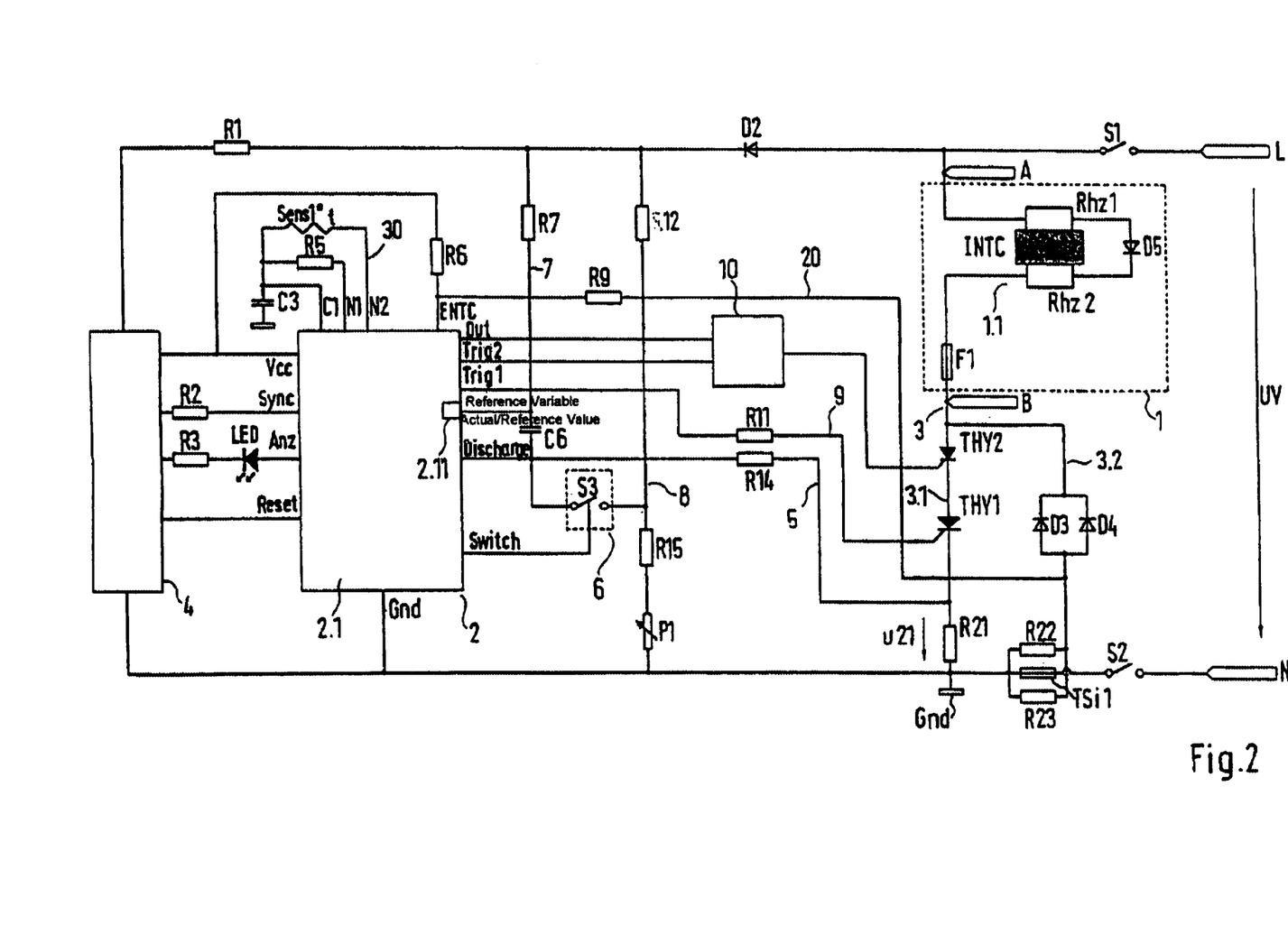
FIG. 2 is a schematic diagram of a further embodiment of an electrical circuit.

With the exception of an additional safety system with a safety circuit 10, the circuit arrangement represented in FIG. 2 corresponds to the embodiment in accordance with FIG. 1. The safety circuit 10, for example in the form of a transistor circuit, is connected by two connectors to two output connectors of the digital circuit arrangement 2.1, at which signal states exist, which preferably are complementary with each other, for monitoring the control circuit 2. On the other side the safety circuit 10 is connected with an additional control element THY2, which can also be embodied as a thyristor, triac, other semiconductor switch or electronically actuated mechanical contact, and is located instead of the diode D01 in the control branch 3.1 of the heating circuit 3 in order to switch off the heating circuit if a malfunction occurs in the control circuit 2.

Figure 3:
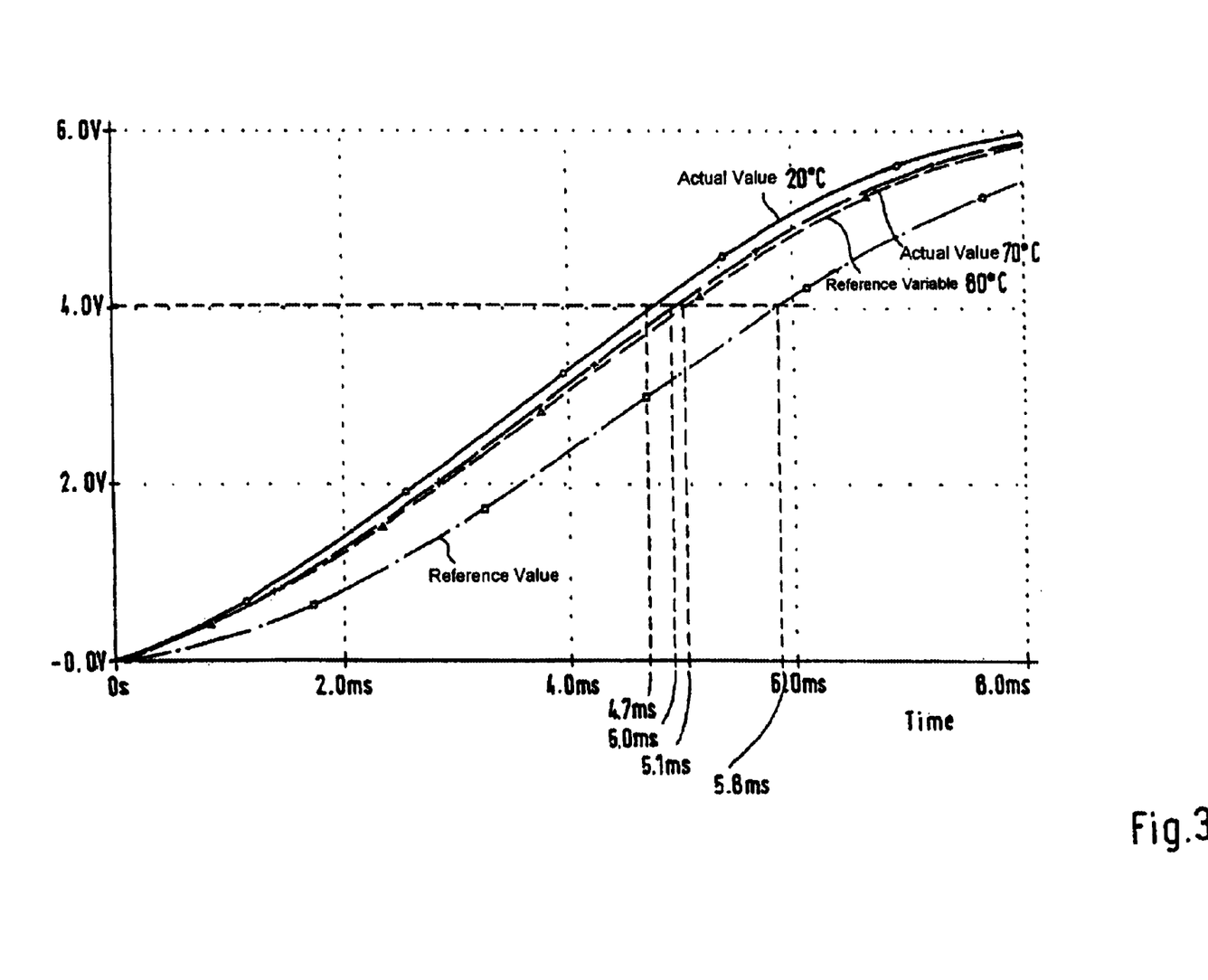
FIG. 3 shows voltage curves of a time-measuring element of the electrical circuit, applied over time, for deriving an actual value, a reference variable and a reference value.

The mode of functioning of the temperature regulation, and thereafter the monitoring of the temperature based on the heating devices represented in FIGS. 1 and 2, and of charge curves of the capacitor C6 represented in FIG. 3, from which a reference value, the actual value at different temperatures of the heat conductor arrangement 1.1, and the reference variable are derived, are explained in greater detail in the following specification. The reference value, the reference variable and the actual value are each determined from the charge curves of the capacitor C6 while it is differently switched, controlled by means of the digital circuit arrangement 2.1, wherein the charging times of the capacitor C6 to achieve a defined charge capacitance are determined by means of a digitizing stage 2.11 provided in the digital circuit arrangement 2.1. A digital time-measuring element with a fixed time cycle and a counter is provided in the digital circuit arrangement 2.1. By comparing the actual value in the form of an actual time value and the reference variable in the form of a reference variable value, a decision regarding the supply of the heating current iH, i.e. whether or not to heat, is made with the aid of the control element THY 1.

For determining the reference value, the capacitor C6 is completely discharged in this case, for example during a negative half wave in the supply voltage UV which is the line voltage, for example, via the connectors Istw/Ref and Discharge. During the reference measurement, the controllable switch S3 and the load switch in the form of the control element THY1 are not triggered, i.e. they are open. A voltage zero crossover of each positive half wave is detected by the synchronization connector Sync, and the charging process of the capacitor C6 as a function of the resistors R7, R14, R21 and the further diode D2 begins, until a digital switching level is reached at the reference input of the digital circuit arrangement 2.1. At a line frequency of 50 Hz, the charging time, which forms the reference value is, for example, 5.8 ms in accordance with FIG. 2.

The controlled switch S3 is not triggered, i.e. it remains open, for forming the actual value, while the control element THY1 is triggered, i.e. the heating circuit 3 is closed. A temperature-proportional voltage drop U21 occurs at the potentiometer resistor R21 as a result of the current flow over the heating resistors Rhz1 and Rhz2, formed by the heating conductors, the safety fuse F1, the diode D01, the control element THY1 and the potentiometer resistor R21. For example, the component voltage in the form of the voltage drop U21 is approximately 1 V (peak of the positive sinus half wave) at 20° C., and approximately 0.7 V at the maximum temperature (80° C.). Because of the parallel rise of the positive charging voltage at the charging resistor R7 and the boost by the component voltage U21, the charging process at the capacitor C6 until the switching level is reached is shortened to a charging time, or an actual time value, of approximately 4.7 ms at 20° C. If the component voltage U21 is changed to approximately 0.75 V in the maximum of the sinus half wave because of the PTC effect in the course of the heating of the heating conductor arrangement 1.1 to 70° C., the charging process of the capacitor C6 takes place in approximately 5.0 ms.

For forming the reference variable in the form of the reference time variable, and with the control element not triggered, i.e. with the heating circuit 3 open and the controllable switch S3 switched on, i.e. closed, the charging voltage of the capacitor C6 at the maximum temperature setting (80° C.) is increased by the potentiometer P1 by approximately 0.7 V (maximum of the positive sinus half wave). This corresponds to the component voltage U21 at the maximum temperature. This results in a charging time of the capacitor C6 up to the switching level of 5.1 ms (reference time variable at 80° C.). In this case the reference variable branch 6 results from the components, namely the further diode D2, the resistor R7, the capacitor C6, the controllable switch S3, the resistor R15 and the adjustable resistor P1 together with the resistor R12 of the further potentiometer 8, wherein the controllable switch S3 is triggered by the digital circuit arrangement 2.1 via the connector Switch.

During the temperature regulation, first the reference value is determined, then the reference variable and the actual value in the form of the reference time variable and the actual time value are determined. Based on the comparison of the charging times at the capacitor C6, which is performed by the derived digital data of the actual time value and the reference time variable, a decision regarding heating or not heating is made. Upon reaching the maximum temperature, identical charging times result at the capacitor C6 (wherein the component voltage U21 is 0.7 V), i.e. 5.1 ms in the present case. Then control of the control element THY1 is interrupted and a break of approximately 1 s is inserted. Then the reference value, reference variable and the actual value are determined within three half waves of the line current. A decision regarding heating or not heating is again made by a further comparison. In case of no heating, a break of approximately 1 s is again inserted. This sequence is repeated.

The comparison between the reference variable and the actual value can also be individually applied to other regulation algorithms in order to perform the heating current iH in the heating circuit 3 via the control element THY1 as the function of a desired chronological temperature behavior and/or as a function of the type of the flexible heating body, for example an electric blanket, a heated cushion, or a heated mattress pad. A suitable regulating algorithm can be easily programmed by a microcomputer or microcontroller, wherein it is possible to take safety regulations into account.

One possibility for temperature regulation includes effecting an excess increase in the reference variable and a controlled reduction of the reference variable to a nominal value. Because of the thermal slowing of the rise of the surface temperature of the heating body 1 to the heating conductor temperature on account of the inferior heat conduction of the materials of the flexible heating body 1, it might be desirable, for example, to improve the temperature rise. One solution for this is offered by fixing a time-related increase of a reference value temperature. In order to achieve an excess in the surface temperature when a heating body has been preheated, the reference variable for the regulation is preset by an optimized method. This can lead, by determining the difference between the reference value and the actual value, and a calculated temporary post-heating as a function thereof after the reference variable temperature is reached. Thus, if a reference variable/actual value difference is large at switch-on, a large reference variable excess is set. The excess is then maintained constant or altered, for example, until the actual value agrees with the excess increase in the reference variable. Then a temperature graduation derived from the excess increase in the reference variable begins. Thus, an advantage is obtained because the surface temperature does not show a breakdown. If however, the reference variable/actual value difference at switch-on is identical with the one during operation, no excess increase of the reference variable and no controlled reduction of the reference variable to a nominal value is effected. Appropriate parameters for assessing the reference variable/actual value difference can be stored in the digital circuit arrangement 2.1. Depending on the type of the flexible heating body 1, for example heated cushions, heated mattress pads or electric blankets, a different calculating method for the excess increase in the reference variable can be provided. For example, this can be realized by evaluating stored software, or by programmed digital inputs, or also by a chronologically controlled hook-up to or a switch-over to another reference variable stage.

The already described reference measurement can be advantageously used for detecting errors. Thus it is possible to compare the measured reference value of the charging time with the reference variable and/or the actual value and to detect an error in the electronics, for example a short circuit in the control element THY1 or in connection with the controllable switch S3, with the results of the comparison and on the basis of previously known or stored or entered values. The errors can be exactly localized and displayed by plausibility comparisons. The display can be designed as a simple LED display up to a variable display indicator, wherein the control can be embodied differently, for example as a blinking warning display, or also acoustically, by the digital circuit arrangement 2.1.

Switching off the heating system can be done by simple or multiple time circuits, wherein switch-off times can be integrated fixedly or separately switchably. During prolonged operation a drop in the temperature can be provided by appropriate programming of the digital circuit arrangement 2.1 in order to prevent scorching of the skin because of continuous high surface temperatures of the heating body.

It is thus possible to provide a time-dependent stepping of the reference variable, or even the switch-off of the heating.

The temperature monitoring arrangement represented in FIGS. 1 and 2, which has the insulating device INTC with a negative resistance temperature curve (NTC effect), the parallel branch 3.2 with the diode arrangement D3, D4 and the resistor arrangement R22, R23, as well as the monitoring branch and the evaluation unit in the digital circuit arrangement 2.1, is laid out so that, for example with a heating effect at one location (hot spot) of the insulating device starting at 80° C. or 90° C., for example, a defined negative half wave of the current flows, because of the bridging of the heating conductor diode D5 over the first heat conductor Rhz1, the insulating device INTC, the second heat conductor Rhz2, the safety fuse F1, the parallel branch diodes D3, D4 and the resistor arrangement R22, R23 to ground Gnd. A temperature-dependent negative voltage results at the resistors R22 and R23 because of this which rises further (in the negative direction) at still higher temperatures. The monitoring branch potentiometer at the resistors R6, R9 is of such a size that the digital input signal at the input connector ENTC of the digital circuit arrangement 2.1 is switched from level one to the zero level only at a negative voltage which corresponds to a defined temperature, such as between 80° C. and 100° C., for example 80° C. or 90° C., of the heat conductor. As long as the zero level lasts, the heating current iH is interrupted via the control element THY1 and heating is switched off. The reaction of the input signal can be indicated to the user by an optical or acoustic or vibrating signal in order to signal a malfunction.

If, for example, because of incorrect use the heating body 1 and therefore the heating conductor arrangement 1.1 is sharply bent or mechanically destroyed, a short circuit results between the first heat conductor Rhz1 and the second heat conductor Rhz2, and because of the excess current in the negative half wave the temperature safety device TSi1 reacts because of the heating of the resistor arrangement R22, R23, and completely interrupts the current from the power supply. The redundant embodiment of the diode arrangement with two parallel branch diodes D3, D4, and of the resistor arrangement with two resistors R22, R23, is used here for additional safety. With the positive half wave, however, the current forming the heating current flows via the control branch 3.1 with the control branch diode D01 (FIG. 1), or the additional control element THY2 (FIG. 2) and the control element THY 1.

The housing temperature monitor 30 is provided for protection against excess current of an intermediate cord switching element, in which the control circuit 2 is arranged, at least in part. High temperatures can be generated inside the housing of the intermediate cord switching element because of stray currents, which can lead to the destruction and loss of electrical components. This problem is increased with increased miniaturization of device switches. Also, in connection with flexible, supple heating bodies, such as electrical blankets or heated mattress pads, there is a danger that the switches become covered or are pushed underneath the heating bodies. A danger of an impermissible excess temperature in the interior of the housing is prevented by the housing temperature monitor 30. When a threshold value is exceeded, the heating current is switched off by the control circuit 2 by the control element THY1 or THY2, if the threshold value is downwardly exceeded, the temperature control is switched on again by the control circuit 2.

In the process, the further capacitor C3 is discharged by the digital circuit arrangement 2.1. Subsequently the charging time of the further capacitor C3 is determined via the reference resistor R5, by which the threshold value of the maximally permissible temperature is indicated. Thereafter the further capacitor C3 is discharged again. In this case the temperature sensor Sens1 which, for example, has an NTC resistor or a PTC resistor and indicates the actual temperature value, is used for establishing an appropriate charging time for the capacitor C3 and for determining the same by the digital circuit arrangement 2.1. Exceeding the temperature can occur by the evaluation unit of the digital circuit arrangement 2.1 for appropriately triggering the heating circuit. Here, the connector C1 of the digital circuit arrangement 2.1 is used as the measuring input and discharge output for the further capacitor C3, the connector N1 as a high-resistance input and logic output for the reference resistor R5, and the connector N2 as a high-resistance input and logic output for the temperature sensor Sens1. The upward or downward deviation from the interior housing temperature can be signaled optically or acoustically, for example by a warning sound and/or blinking light or light flashes.

It is possible with the display device, for example a display unit LED, to show the user the various operational states of the heating devices, for example reduction of the reference variable, timed switch-off, or the like, in many ways, for example by color, numbers, symbols, text, or the like. Thus, it is possible to provide a blinking operation, changing colors, flashing displays or similar, or also to realize a sound, voice or vibration indication. For example, a vibrating alarm can be provided in the heating body or in a cord switch until the reference variable temperature is lowered in order to prevent the user from falling asleep during repeated operations during critical phases. In this case the display device can also be designed so that it separately reacts to the monitoring signal obtained by the insulating device INTC.

What is claimed is:

1. A heating system having an electrical heating conductor arrangement (1.1) which is integrated into a flexible heating body (1) connectible to a supply voltage (UV) by a connecting cable and which has a first conductor (Rhz1) and an adjacent second conductor (Rhz2), placed in series with the first conductor (Rhz1) and separated from the first conductor (Rhz1) by an insulating device (INTC), the heating system having a heating circuit (3), which is formed by the heating conductor arrangement and further elements, including a control element (THY1) for a heating current (iH), and having a control circuit (2) which is connected to a control member (3) for affecting the heating current (iH) and regulating a temperature, the heating system comprising:

the insulating device (INTC) having a resistance characteristic which decreases with temperature, the control circuit (2) coupled via a monitoring branch (20) to a section of the heating circuit (3) which as a function of the temperature of the insulating device (INTC) responds to a resistance temperature change in the insulating device (INTC) for picking up an electrical monitoring current or voltage, and the control circuit (2) responding when a monitoring signal exceeds a threshold and interrupts the heating current (iH) by triggering the control element (THY1).

2. The heating system in accordance with claim 1, wherein a control branch (3.1) having the control element (THY1), and a parallel branch (3.2) located parallel with the control branch (3.1) are formed in the heating circuit (3), and the monitoring signal is picked up in the parallel branch (3.2).

3. The heating system in accordance with claim 2, wherein a temperature-dependent potentiometer is formed by the insulating device (INTC) and a resistor arrangement (R22, R23), which reacts via a parallel branch diode arrangement (D3, D4) only in connection with a half-wave of a supply voltage (UV), at which the monitoring signal is picked up and supplied to the control circuit (2) via a monitoring branch (20) of an evaluation unit.

4. The heating system in accordance with claim 3, wherein one of a heating conductor diode (D5) and a rectifier is arranged between the first conductor (Rhz1) embodied as an interior conductor and the second conductor (Rhz2) embodied as an exterior conductor and is connected in series with them, the parallel branch (3.2) has the parallel branch diode arrangement (D3, D4) connected in series with the resistor arrangement (R22, R23) and has at least one parallel branch diode (D3, D4) arranged in a direction opposite to a conducting direction of the heating conductor diode (D5), and the control branch (3.1) has at least one structural element (D01, THY1, THY2) connected in the conducting direction of one of the heating conductor diode (D5) and the rectifier.

5. The heating system in accordance with claim 4, wherein two parallel branch diodes (D3, D4) are connected in parallel, and the resistor arrangement (R2, R23) comprises two parallel branch resistors (R22, R23) which are connected parallel with each other and are connected with a ground (Gnd).

6. The heating system in accordance with claim 5, wherein a temperature safety device (TSi1) is in a thermal operative contact with the resistor arrangement (R22, R23).

7. The heating system in accordance with claim 6, wherein the monitoring signal in the monitoring branch (20) is connected with an input (ENTC) of a digital circuit arrangement (2.1) containing an evaluation unit.

8. The heating system in accordance with claim 7, wherein the monitoring signal is connected to the input (ENTC) by a potentiometer with monitoring branch resistors (R9, R6) arranged in the monitoring branch (20).

9. The heating system in accordance with claim 8, wherein for picking up an electrical measurement value which is a function of the temperature of the insulating device (INTC) the control circuit (2) is coupled via a coupling branch (5) with the heating circuit (3), and the control circuit (2) controls the control element (THY1) for adjusting a set temperature of the heating body (1).

10. The heating system in accordance with claim 9, wherein a measurement value (U21) is picked up by the potentiometer formed in the heating circuit (3), which is formed by the heating conductor arrangement (11.1) forming a temperature-dependent resistor and by at least one resistor element (21), the measurement value (U21) is fed via the coupling branch (5) to an analog time function element connected upstream of a digital stage (2.11) with a resistance/capacitance circuit (R7, C6), the digital stage (2.11) has a time-measuring element forming an actual digital value that corresponds to an actual time value up to the time a preset or presettable charge voltage of the capacitor (C6) is reached, a reference time variable is presettable as a reference variable in the digital stage (2.11), and for heating, a control of a control member (THY2) occurs as a function of a deviation of an actual time value from the reference time variable.

11. The heating system in accordance with claim 10, wherein the control circuit (2) has a safety circuit (10) with an error sensor arrangement, and a second control element (THY2) which is controlled by the safety circuit (10), is arranged in the heating circuit (3) in series with respect to the control element (THY 1), wherein the safety circuit (10) responds to an error in the control circuit (2) and interrupts the heating current (iH) by triggering the second control element (THY2).

12. The heating system in accordance with claim 11, wherein a safety fuse (F1) is arranged in the heating circuit (3) one of on and outside of the heating body (1).

13. The heating system in accordance with claim 12, wherein the heating conductor arrangement (1.1) has only two heating conductor ends extending from the heating body (1) and at connecting points (A, B) are directly connected via one of a twin-pole plug/coupling unit and a hot lead connection with a twin-wire connecting line.

14. The heating system in accordance with claim 1, wherein the heating conductor arrangement (1.1) has only two heating conductor ends extending from the heating body (1) and at connecting points (A, B) are directly connected via one of a twin-pole plug/coupling unit and a hot lead connection with a twin-wire connecting line.

15. The heating system in accordance with claim 13, wherein at least one of an optical display unit and a visual display unit, which responds to the monitoring signal, is provided.

16. The heating system in accordance with claim 1, wherein a temperature-dependent potentiometer is formed by the insulating device (INTC) and a resistor arrangement (R22, R23), which reacts via a parallel branch diode arrangement (D3, D4) only in connection with a half-wave of a supply voltage (UV), at which the monitoring signal is picked up and supplied to the control circuit (2) via a monitoring branch (20) of an evaluation unit.

17. The heating system in accordance with claim 16, wherein one of a heating conductor diode (D5) and a rectifier is arranged between the first conductor (Rhz1) embodied as an interior conductor and the second conductor (Rhz2) embodied as an exterior conductor and is connected in series with them, the parallel branch has a parallel branch diode arrangement connected in series with the resistor arrangement (R22, R23) and has at least one parallel branch diode (D3, D4) arranged in a direction opposite to a conducting direction of the heating conductor diode (D5), and a control branch (3.1) has at least one structural element (D01, THY1, THY2) connected in the conducting direction of one of the heating conductor diode (D5) and the rectifier.

18. The heating system in accordance with claim 3, wherein two parallel branch diodes (D3, D4) are connected in parallel, and the resistor arrangement (R22, R23) comprises two parallel branch resistors (R22, R23) which are connected parallel with each other and are connected with a ground (Gnd).

19. The heating system in accordance with claim 4, wherein a temperature safety device (TSi1) is in a thermal operative contact with the resistor arrangement (R22, R23).

20. The heating system in accordance with claim 1, wherein the monitoring signal in the monitoring branch (20) is connected with an input (ENTC) of a digital circuit arrangement (2.1) containing an evaluation unit.

21. The heating system in accordance with claim 20, wherein the monitoring signal is connected to the input (ENTC) by a potentiometer with monitoring branch resistors (R9, R6) arranged in the monitoring branch (20).

22. The heating system in accordance with claim 1, wherein for picking up an electrical measurement value which is a function of the temperature of the insulating device (INTC) the control circuit (2) is coupled via a coupling branch (5) with the heating circuit (3), and the control circuit (2) controls the control element (THY1) for adjusting a set temperature of the heating body (1).

23. The heating system in accordance with claim 22, wherein the measurement value (U21) is picked up by a potentiometer formed in the heating circuit (3), which is formed by the heating conductor arrangement (1.1) forming a temperature-dependent resistor and by at least one resistor element (21), a measurement value (U21) is fed via the coupling branch (5) to an analog time function element connected upstream of a digital stage (2.11) with a resistance/capacitance circuit (R7, C6), the digital stage (2.11) has a time-measuring element forming an actual digital value that corresponds to an actual time value up to the time a preset or presettable charge voltage of the capacitor (C6) is reached, a reference time variable is presettable as a reference variable in the digital stage (2.11), and for heating, a control of a control member (THY2) occurs as a function of a deviation of an actual time value from the reference time variable.

24. The heating system in accordance with claim 1, wherein the control circuit (2) has a safety circuit (10) with an error sensor arrangement, and a second control element (THY2) which is controlled by the safety circuit (10), is arranged in the heating circuit (3) in series with respect to the control element (THY 1), wherein the safety circuit responds to an error in the control circuit (2) and interrupts the heating current (iH) by triggering the second control element (THY2).

25. The heating system in accordance with claim 1, wherein a safety fuse (F1) is arranged in the heating circuit (3) on or outside of the heating body (1).

26. The heating system in accordance with claim 1, wherein at least one of an optical display unit and a visual display unit, which responds to the monitoring signal, is provided.

* * * * *